United States Patent
Rheker et al.

(10) Patent No.: US 10,087,104 B2
(45) Date of Patent: Oct. 2, 2018

(54) PROCESS AND APPARATUS FOR IMPROVING THE COMBUSTION OF SECONDARY FUEL IN A ROTARY KILN AND PROCESS FOR RETROFITTING A ROTARY KILN WITH A BURNER ASSEMBLY

(71) Applicant: L'Air Liquide, Societe Anonyme pour l'Etude et l'Exploitation des Procedes Georges Claude, Paris (FR)

(72) Inventors: Frank Rheker, Dusseldorf (DE); Dirk Hölscher, Dusseldorf (DE); Robert Klein, Aachen (DE)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 275 days.

(21) Appl. No.: 14/434,254

(22) PCT Filed: Oct. 4, 2013

(86) PCT No.: PCT/EP2013/070736
§ 371 (c)(1),
(2) Date: Apr. 8, 2015

(87) PCT Pub. No.: WO2014/056804
PCT Pub. Date: Apr. 17, 2014

(65) Prior Publication Data
US 2015/0232382 A1    Aug. 20, 2015

(30) Foreign Application Priority Data

Oct. 8, 2012   (EP) .................................. 12187645
Oct. 18, 2012  (EP) .................................. 12188991

(51) Int. Cl.
C04B 7/44    (2006.01)
F27B 7/36    (2006.01)
F23L 7/00    (2006.01)

(52) U.S. Cl.
CPC ............ *C04B 7/443* (2013.01); *C04B 7/4438* (2013.01); *F23L 7/007* (2013.01); *F27B 7/36* (2013.01);
(Continued)

(58) Field of Classification Search
CPC .................................. F27B 7/36; F23L 7/007
See application file for complete search history.

(56) References Cited

U.S. PATENT DOCUMENTS 3,274,979 A * 9/1966 Petit ......................... F28G 3/16
                                                    122/392
4,741,694 A * 5/1988 Mason ...................... F27B 7/34
                                                    432/105
(Continued)

FOREIGN PATENT DOCUMENTS

EP    0 726 437    8/1996
EP    0 866 295    9/1998
(Continued)

OTHER PUBLICATIONS

International Search Report and Written Opinion for PCT/EP2013/070736, dated Oct. 31, 2013.

*Primary Examiner* — Nathaniel Herzfeld
(74) *Attorney, Agent, or Firm* — Christopher J. Cronin

(57) ABSTRACT

The present invention relates to a process and apparatus for improving the combustion of a secondary fuel supplied in a first stream in a rotary kiln, wherein the rotary kiln has a burner assembly comprising a main burner and a plurality of feed channels for various media, of which one is designed for the supply of a secondary fuel, in particular in the form of particles or shreds in a stream of compressed air. Accord- (Continued)

ing to the invention, a tubular oxygen lance for an oxygen-rich gas, in particular, technical grade gaseous oxygen, or an oxygen-rich liquid, in particular, technical grade liquid oxygen, with an angled nozzle at its end, is arranged in or on a feed channel of the burner assembly, whereby the oxygen lance is brought into such a position that the oxygen emerging from a nozzle forms a second stream that strikes a first stream of secondary fuel. The present invention may be considered for new constructions of burner assemblies for rotary kilns, but mainly serves for retrofitting existing burner assemblies in which mostly feed channels are available as required for inserting an oxygen lance in the present invention. Targeted delivery of gaseous or liquid oxygen, or oxygen-enriched gas or liquefied gas to a secondary fuel can significantly improve the combustion process and consequently significantly reduce exhaust emissions, in particular, the emission of carbon monoxide.

24 Claims, 3 Drawing Sheets

(52) U.S. Cl.
CPC ............... *F23L 2900/07005* (2013.01); *F27M 2003/03* (2013.01); *Y10T 29/49716* (2015.01)

(56) References Cited

U.S. PATENT DOCUMENTS

| | | | |
|---|---|---|---|
| 5,007,823 A * | 4/1991 | Mayotte | F27B 7/20 432/105 |
| 5,413,476 A * | 5/1995 | Baukal, Jr. | F23L 7/007 431/10 |
| 6,077,072 A * | 6/2000 | Marin | F27B 7/34 110/226 |
| 6,318,278 B1 | 11/2001 | Dugue et al. | |
| 7,452,203 B2 * | 11/2008 | Laux | F27B 7/34 432/103 |
| 2003/0230196 A1 * | 12/2003 | Kim | B01D 53/22 96/4 |
| 2005/0039647 A1 * | 2/2005 | Katsui | F23G 5/245 110/165 R |
| 2007/0215019 A1 * | 9/2007 | von Scheele | C22B 5/16 110/236 |
| 2007/0287109 A1 | 12/2007 | Lodin | |
| 2009/0130615 A1 * | 5/2009 | Penfornis | C04B 7/434 431/8 |
| 2011/0127348 A1 * | 6/2011 | Kerschbaum | C21C 5/4613 239/13 |
| 2012/0129109 A1 * | 5/2012 | Hunsinger | F23B 80/02 431/2 |
| 2014/0017619 A1 * | 1/2014 | Rheker | F23C 6/02 431/10 |

FOREIGN PATENT DOCUMENTS

| | | |
|---|---|---|
| EP | 0 987 508 | 3/2000 |
| EP | 1 065 460 | 1/2001 |
| EP | 1 065 461 | 1/2001 |

* cited by examiner

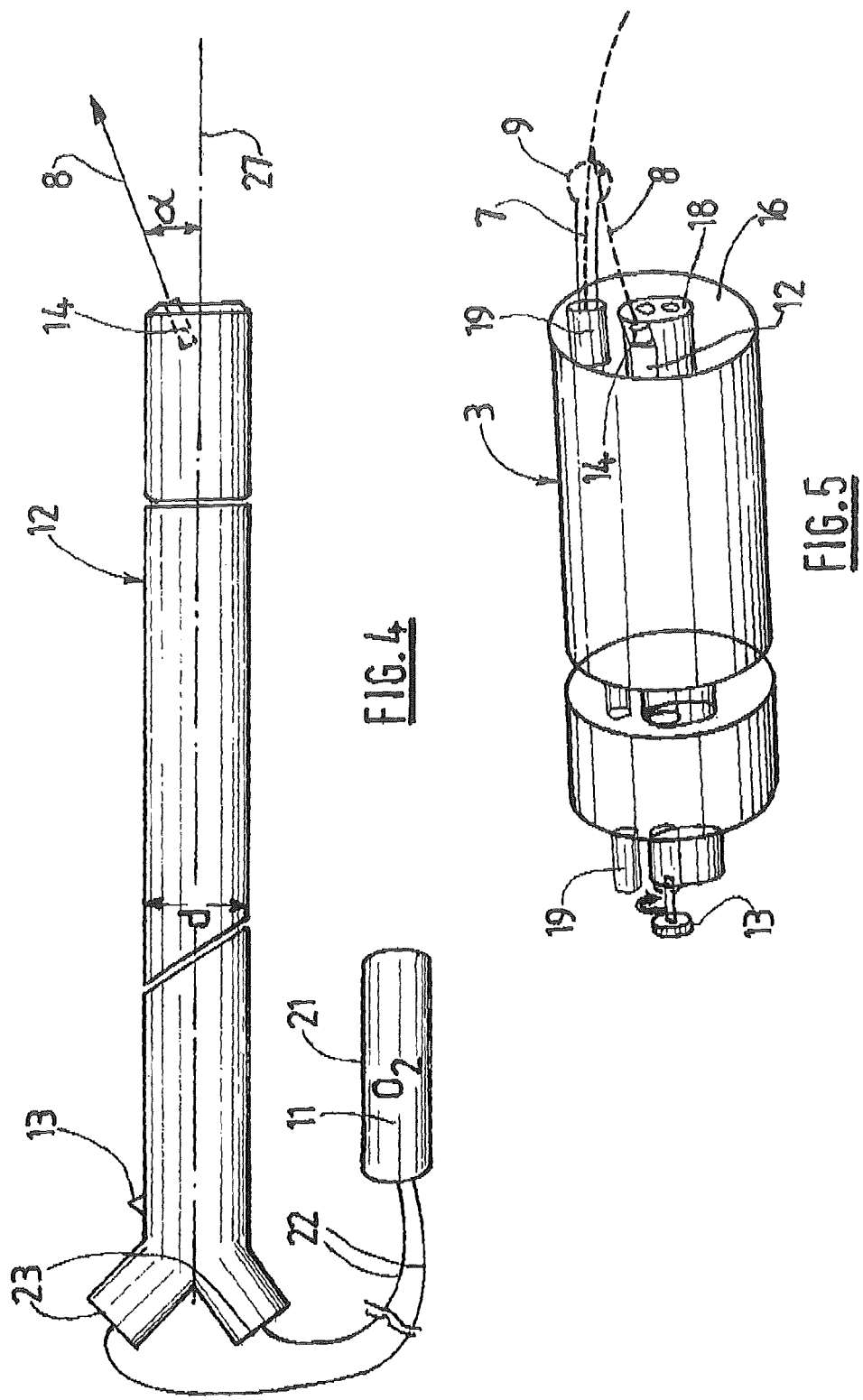

PROCESS AND APPARATUS FOR IMPROVING THE COMBUSTION OF SECONDARY FUEL IN A ROTARY KILN AND PROCESS FOR RETROFITTING A ROTARY KILN WITH A BURNER ASSEMBLY

CROSS-REFERENCE TO RELATED APPLICATIONS

This application is a § 371 of International PCT Application PCT/EP2013/070736, filed Oct. 4, 2013, which claims § 119(a) foreign priority to EP patent application 12187645.2, filed Oct. 8, 2012 and EP patent application 12188991.9, filed Oct. 18, 2012.

BACKGROUND

Field of the Invention

The present invention is in the area of rotary kilns, such as, for example, are used in the manufacture of cement.

Rotary kilns can be particularly large-scale installations, often with a kiln or furnace length greater than 50 m.

Different fuels can be used for heating the kiln.

Related Art

In general, a rotary kiln has at least one main burner for primary fuel, such as oil, gas and pulverised coal. Options for adding other fuels, so-called secondary fuels, can be provided. As secondary fuels, many materials come into consideration, including plastic waste, textile waste, old tyres and the like. These secondary fuels are generally supplied by compressed air as small particles, shreds or scraps. Typically, a secondary fuel has a lower calorific value than the primary fuel. As a consequence, its complete combustion often requires additional measures, in particular, to prevent or reduce the emission of pollutants.

The basic construction of a rotary kiln is, for example, described in EP 0 866 295 A1. It proposes to improve combustion by using an oxygen lance to supply liquid oxygen.

Likewise, the basic construction of a rotary kiln is, for example, described in EP 1 065 461 B1. Improving the combustion of secondary fuel with the addition of oxygen is also proposed there.

In U.S. Pat. No. 6,318,278 B1, a rotary kiln is described as it may be constructed in the present invention. This document also shows the use of an oxygen lance in a rear internal combustion area, whereby also a supply of oxygen held at an angle to the direction of the main burner is taken into consideration.

EP 0 726 437 A1 is concerned with different oxygen lances in a rotary kiln, whereby one of the oxygen lances is introduced into the centre of a burner assembly. However, the use of a secondary fuel is not covered here.

SUMMARY OF THE INVENTION

The object of the present invention is to improve the combustion of a secondary fuel in a rotary kiln, preferably by using available possibilities of typical burner assemblies, in particular with a view to reduce emission of carbon monoxide without thereby increasing the emission of other unwanted contaminants above the prescribed limits, such as nitrogen oxides.

To achieve this object, a process according to claim 13 and an apparatus according to claim 5 are employed. Advantageous embodiments that may be used individually or in combination are disclosed in the respective dependent claims.

According to the invention, the process to improve the combustion of a first stream of secondary fuel supplied to a rotary kiln, whereby the rotary kiln burner assembly preferably has a cylindrical burner assembly with a geometric centre axis, with a main burner designed to supply a primary fuel and a plurality of feed channels for various media, one of said feed channels being designed to supply a secondary fuel, for example in the form of particles or shreds in a stream of compressed air, is characterised in that a tubular oxygen lance for an oxygen-rich gas, in particular, oxygen gas, or an oxygen-rich liquid, especially liquid oxygen, having an angled nozzle arranged at its feed end is positioned in or on a feed is channel of the burner assembly, whereby the oxygen lance is positioned so the oxygen emerging from the nozzle forms a second stream which directed towards and impacts or strikes the first stream.

The oxygen lance is preferably installed or positioned in (i.e. inside) said feed channel of the burner assembly. With such an embodiment, the oxygen lance is also accessible from the rear end of the burner (i.e. from the cold side away from the furnace interior).

It is however also possible to install said oxygen lance on said channel, i.e. onto the extremity of the channel at the hot side of the burner (i.e. towards the furnace interior). In the latter case, the oxygen lance can be particularly short, or can even essentially consist of the angled nozzle as such.

The oxygen gas used is of technically available purity and concentration. Likewise, the liquid oxygen is also of industrially available purity.

In the present context:
"oxygen-rich gas" refers to a gas having an oxygen ($O_2$) content of between 50% vol and 100% vol, preferably between 80% vol and 100% vol;
"oxygen gas" refers to a gas having an oxygen ($O_2$) content of between 90% vol and 100% vol, preferably between 95% vol and 100% vol and more preferably between 99% vol and 100% vol, preferably between 80% vol and 100% vol;
"oxygen-rich liquid" refers to a liquid having an oxygen ($O_2$) content of between 50% vol and 100% vol;
"liquid oxygen" refers to a liquid having an oxygen ($O_2$) content of between 90% vol and 100% vol, preferably between 95% vol and 100% vol and more preferably between 99% vol and 100% vol;
two fluid streams are said to impact or strike one another when the orientation of the streams is such that they are directed towards one another at an angle so that the two streams meet at a point downstream of their respective points of injection;
"bent nozzle" is synonymous with "angled nozzle" and refers to a nozzle located at the feed end of a lance so as to direct a stream of fluid in an injection direction which forms a non-zero angle with the axial direction; i.e. with the geometric center axis, of the lance upstream of the nozzle.

The burner assembly is typically located at one longitudinal end of the rotary kiln, typically so that the geometric center axis of the burner assembly coincides with the longitudinal axis of the kiln. The combustion gases are typically evacuated from the kiln at the longitudinal end opposite the burner assembly.

In general, the secondary fuel is supplied to the rotary kiln above the main burner or in the upper region of the main burner, so that the secondary fuel is ignited by the rising heat of the primary-fuel flame of the main burner and is combusted with surrounding oxygen.

Experiments have shown that the supply of oxygen specifically to the first stream secondary fuel already before or during the ignition of the secondary fuel can significantly improve its combustion. If the second stream of oxygen or oxygen-rich fluid encounters or impacts the first stream of secondary fuel, much less carbon monoxide is produced in the subsequent combustion of the secondary fuel, than without the such impact between the two streams.

With the present invention, the oxygen or oxygen-rich fluid supplied by the oxygen lance can be used much more effectively than with an untargeted oxygen feed in the rotary kiln.

It should be noted that a typical burner assembly for a large-scale rotary kiln may itself have a length of about 10 m. There is hence no practical way to arrange an oxygen lance running obliquely to the main flow direction (which typically coincides with the geometric centre axis of the burner assembly) or obliquely to the flow direction of the secondary fuel (first stream) without making significant changes to the installation or assembly.

According to the present invention, the oxygen lance is introduced through a feed channel, of which typical burner assemblies have several, which is otherwise not used in the given operating state of the kiln. Such feed channels may, for example, be parallel to the geometric axis of the burner assembly. A bent or angled nozzle at the feed end of the oxygen lance directs the second stream (of oxygen or oxygen-rich fluid) in a desired direction.

When using a secondary fuel, the main burner continues to operate with the primary fuel, whereby said combustion of the primary fuel supports or promotes complete combustion of the secondary fuel in the further process of the rotary kiln.

In general, in order to achieve the aim of the invention, it is sufficient to insert the oxygen lance in an available feed channel with the correct rotation angle of the oxygen lance and its angled nozzle in relation to the feed channel for secondary fuel (or to install the oxygen lance onto said feed channel), to achieve the correct orientation of the second stream in relation to the first stream and thereby to achieve impact between the second and the first stream.

In particular, in geometrically difficult conditions and with possible swirl flows in the rotary kiln, it is nevertheless useful to measure the amount of undesirable components in the exhaust gas, in particular carbon monoxide, and to rotate the oxygen lance by way of fine-tuning and/or modify the supply of oxygen to achieve minimal emissions of said undesirable components, or at least an acceptable value for all of the various undesirable components in the exhaust gas. Indeed, many countries impose maximum values on such emissions. This allows particularly clean combustion even for complicated flow conditions inside the kiln. Such fine-tuning is most easily done when the oxygen lance is installed inside the feed channel.

The process is preferably configured so that the second stream impacts or strikes the first stream at a distance from the burner assembly corresponding to less than 10% of the internal kiln length, preferably less than 4% of the internal kiln length.

For example, in the case of a large scale installation as described above, the process is preferably configured so that the second stream strikes the first stream within less than 5 m after leaving the burner assembly, preferably after less than 2 m. In this way, it is achieved that the oxygen from the oxygen lance does not primarily increase the temperature during combustion of the primary fuel which takes place further downstream in the rotary kiln, which could result in increased production of nitrogen oxide, but is mainly used to promote combustion of the secondary fuel.

The oxygen supplied by the oxygen lance can also serve to achieve a slightly superstoichiometric ratio, i.e., an excess of oxygen in relation to fuel in the furnace, to achieve the most complete combustion possible of all fuels (primary and secondary) along the length of the rotary kiln.

A device according to the invention for improving the combustion of secondary fuel supplied as a first stream to a rotary kiln is also disclosed. The rotary kiln has a burner assembly comprising a main burner for a primary fuel and a plurality of feed channels for various media, one of said feed channels, called secondary fuel channel, being a feed channel for the supply the first stream of secondary fuel, for example particles or shreds in a compressed-air stream. The device or apparatus is characterised in that a tubular oxygen lance for an oxygen-rich gas, in particular oxygen gas, or for an oxygen-rich liquid, especially liquid oxygen, is located in another one of said feed channels, called oxygen channel. Said oxygen lance has a bent or angled nozzle arranged at its feed end. Oxygen-rich gas or liquid emerging from the nozzle forms a second stream. The angled nozzle of the oxygen lance is positioned so that, during rotary kiln operation, said second stream of oxygen-rich gas or liquid impacts the first stream of secondary fuel supplied by the secondary fuel channel. The angled nozzle of the oxygen lance is thus positioned precisely so that it is turned towards the first feed channel for secondary fuel.

To facilitate orientation of the nozzle in the correct position, the oxygen lance preferably has means (angle position indicator) for indicating the direction/orientation of the angled nozzle inside the rotary kiln. The oxygen lance preferably has such an angle position indicator which protrudes at the back or rear end of the burner assembly when the lance is positioned in the oxygen channel. This can, for example, be a marking or direction arrow on the outside of the oxygen lance and aligned with the angled nozzle. If this marking points to the inlet of the secondary fuel channel for the secondary fuel, the nozzle inside the rotary kiln also points in the right direction (i.e. the feed end of the secondary fuel channel).

According to the invention, the angled nozzle forms an angle ranging from 5° to 45° with the axial direction of the lance, preferably from 5° to 30°, more preferably from 5° to 25°, and most preferably from 10° to 20°.

In this way it can be achieved that the second stream of oxygen-rich fluid strikes the first stream of secondary fuel within a relatively short distance after leaving the burner assembly. When used with an oxygen-rich liquid, the design of the nozzle can affect the nature of the second stream. In particular, the design of the nozzle can be so as to achieve a degree of atomisation of the oxygen-rich liquid in the second stream.

It has been found experimentally that certain improvements in combustion can be achieved with a non-angled nozzle on the oxygen lance, that is, by axial injection of oxygen, in particular, when the oxygen stream has a sufficiently long reach within the rotary kiln through the use of a suitable nozzle. For this reason, a non-angled or less angled auxiliary nozzle which takes over this function can be provided as a second nozzle at the end of the oxygen lance.

The proportion of oxygen ($O_2$) supplied through the oxygen lance is relatively small. Typically between 3% and 10% of the oxygen ($O_2$) which enters the rotary kiln is supplied through the oxygen lance, preferably between 4% and 6%. This enables the oxygen lance to have a smaller outer diameter than the inner diameter of the feed channel in which it is arranged. Preferably, the outer diameter of the oxygen lance is at least 20% smaller than the inner diameter of the oxygen channel.

Typical burner assemblies comprise several different feed channels for different fuels or other purposes. One of them may then be suitably selected as oxygen channel for the oxygen lance. The diameter difference ensures that there will be no problems when inserting, turning or removing the oxygen lance, even in the presence of fouling.

Preferably, the oxygen lance is placed to be rotatable and slidable in a feed channel, so that its position is determined by its own weight (i.e. by gravity) and is sufficiently fixed thereby. The weight of the oxygen lance will ensure that it is always located at the bottom in the oxygen channel, and the friction is sufficiently great to prevent any accidental undesirable rotation or displacement of said lance within the oxygen channel.

As the oxygen lance, according to need and dimensioning, has to be supplied with oxygen under relatively high pressure, it is advantageous to provide two inlet connections, such as flanges, for the connection of two flexible tubes, so to keep the pressure drop low in said tubing from an oxygen-rich fluid supply reservoir to the oxygen lance.

In a preferred embodiment of the invention, the oxygen lance and its nozzle(s) are so dimensioned and connected to a supply of liquid or gaseous oxygen-rich fluid that the second stream issuing from the angled nozzle on coinciding/impacting with the first stream has a diameter which is the same as or smaller than the diameter of the first stream of secondary fuel. In this way, it is avoided that a substantial part of the oxygen-rich fluid of the second stream flows past the (first stream of the) secondary fuel to the upper region of the rotary kiln, where said oxygen-rich fluid provides little contribution to improve the combustion.

If an auxiliary nozzle is provided in the oxygen lance, as described above, said auxiliary nozzle is designed so that the oxygen issuing from it has as large a travel range as possible within the rotary kiln. This can preferably be achieved with a Laval auxiliary nozzle.

As, for the present invention, use should preferably be made of the available features of burner assemblies, it cannot always be assumed that symmetrical positions (with respect to the geometric centre axis of the burner assembly) are available for respectively the oxygen channel and the secondary fuel channel. In fact, it may even be advantageous if the (imaginary) geometric-line connecting the two feed channels for respectively the secondary fuel and the oxygen lance does not intersect the geometric centre axis of the burner assembly. When the oxygen lance is arranged obliquely below the first stream, so that the second stream does not strike the first stream exactly vertically from below, but instead somewhat from the side (i.e. from below, but at an angle with the vertical plane through the first stream of secondary fuel). This may even lead to a desirable swirl effect and improved subsequent mixing of the secondary fuel with the primary flame generated by the combustion of the primary fuel. By means of such an arrangement, it is also achieved that the oxygen-rich fluid stream does not in its travel path react mainly with the primary fuel and is not strongly diverted by the combustion air for the primary fuel.

In any case, it is advantageous that the first stream enters the rotary kiln vertically higher than the second stream, and that the second stream strikes the first vertically or obliquely from below.

BRIEF DESCRIPTION OF THE FIGURES

Hereinafter, the present invention will be explained in detail with reference to several embodiments in the drawings. Shown are.

DETAILED DESCRIPTION OF THE INVENTION

Figure 1:
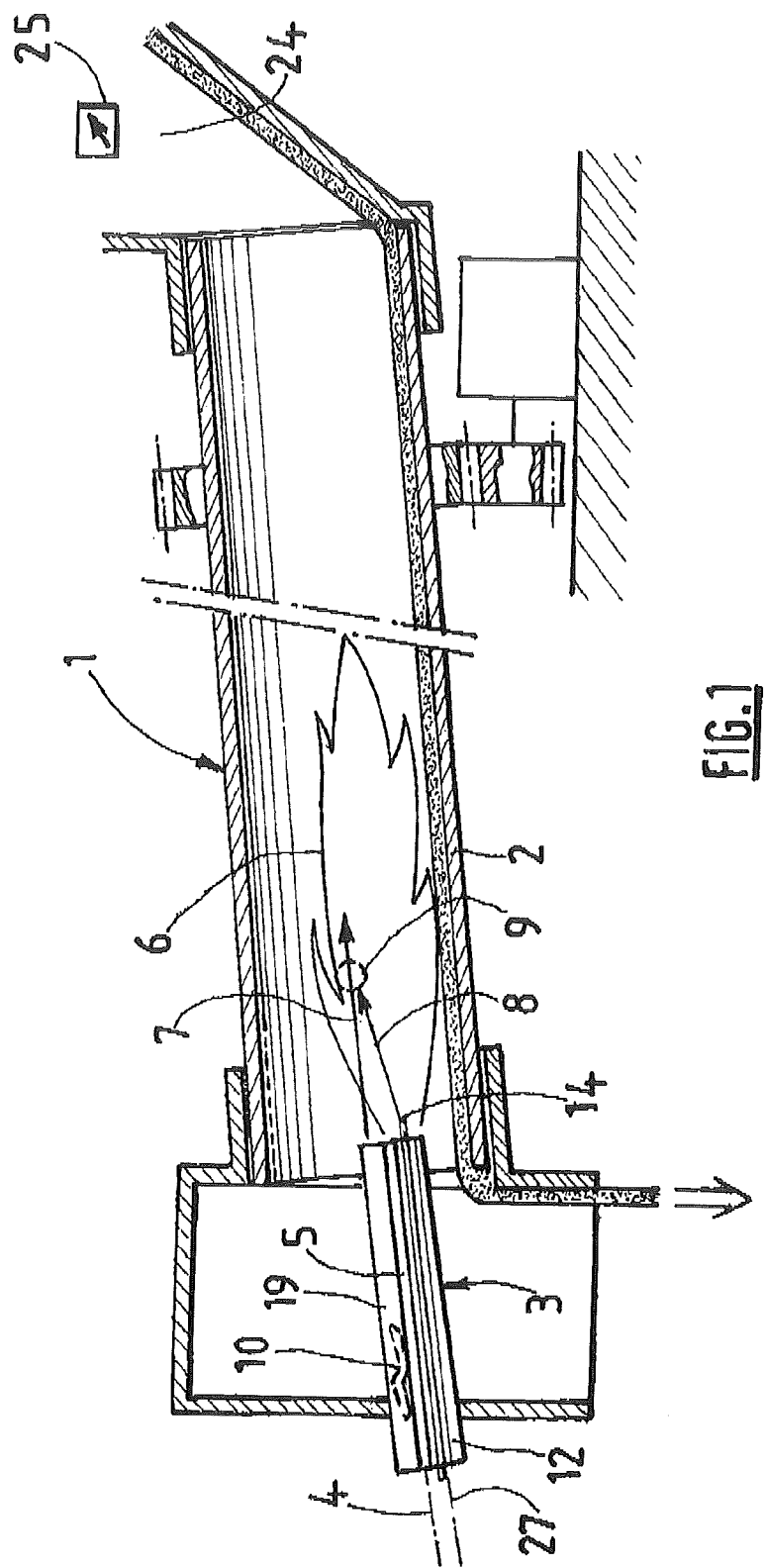
FIG. 1. A schematic view of a rotary kiln in longitudinal section.

FIG. 1 shows schematically a typical rotary kiln 1 for manufacturing cement 2, which cement passes through the rotary kiln 1 in powder form. At the lower end of the rotary kiln 1, a burner assembly 3 is arranged, preferably of approximately cylindrical shape. Said burner assembly 3 comprises a main burner 5 which is fed with a primary fuel. During operation of the rotary kiln 1, a primary flame 6 is formed by combustion of the primary fuel, which generates most of the heat in the kiln (i.e. more than 50% of the heat, preferably more than 60%). However, in particular in the light of the increasing pressure to use alternative fuels, such as biomass, it is also possible to operate the furnace so that the combustion of the primary fuel provides less than 50% of the total heat in the kiln, preferably less than 30% or even less than 25%. It has to be pointed out that, although common types of fuel, such as coal or oil, are generally used as the primary fuel, other types of fuel, known as alternative fuels, may also be used as the primary fuel, alone or admixed with a common fuel type. The burner assembly 3 further comprises at least one feed channel 19 for a secondary fuel 10, also known as fluff, which is typically supplied in small pieces by means of a conveyor fluid stream, such as an air stream. In the rotary kiln 1 this secondary fuel 10 is injected as a first stream 7. In the burner assembly 3 according to the invention, an oxygen lance 12 is also arranged for injecting a second, oxygen-rich, stream 8 during kiln operation. The first stream 7 and the second stream 8 meet at a junction portion 9 since the oxygen lance 12, which runs parallel to the feed channel 19 for the secondary fuel, has a bent nozzle 14 at its feed end. It is thereby achieved that the second stream exits at an angle $\alpha$ to the geometrical centre axis 27 of the oxygen lance 12 and also at an angle $\alpha$ to the geometrical centre axis 4 of the burner assembly 3, i.e. The combustion gases generated by the combustion of primary and secondary fuel are discharged from the rotary kiln 1 to an exhaust hood 24 equipped with an analyser 25 for measuring emission levels of certain components, especially pollutants, in the combustion gases.

Figure 2:
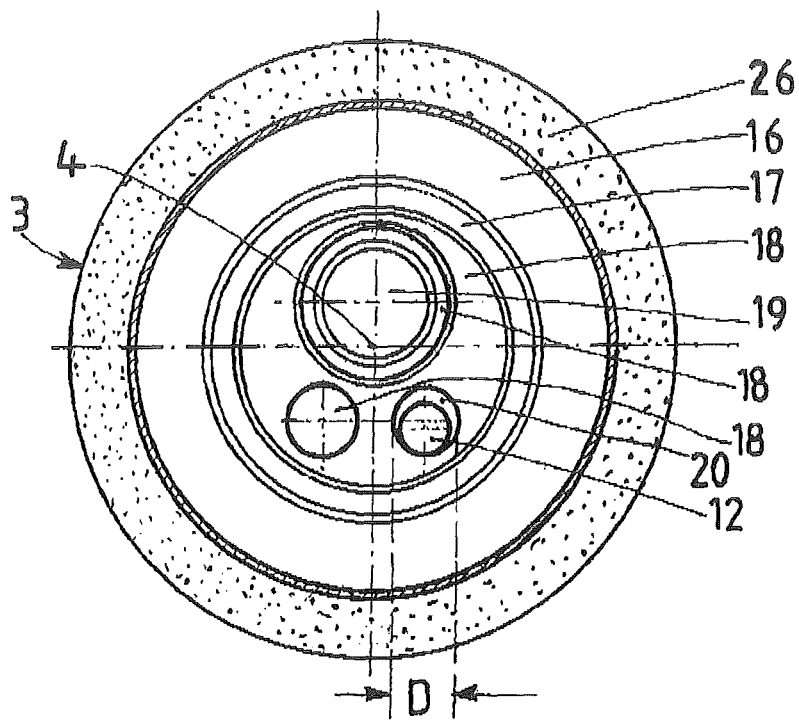
FIG. 2. A schematic cross section view of a burner assembly according to the invention, FIG. 3. A schematic longitudinal section through the intermediate portion of an oxygen lance according to the invention, FIG. 4. A schematic side view of an oxygen lance according to the invention, FIG. 5. The principle of operation of the invention in a schematic perspective view.

FIG. 2 shows a cross section through the burner assembly 3. Burner assembly 3 comprises separate feed tunnels, passages or channels located in different areas. Some of said feed tunnels are concentric to the geometric centre axis 4 of the burner assembly 3, others are eccentric. The overall burner assembly 3 has an outer insulation 26, which surrounds a feed channel 16, which is formed as an annular space. This can, for example, be used for the supply of primary air. Further inside is another feed channel which, for example, can be used for the supply of pulverized coal as primary fuel. Further inside there is another feed channel, which again can be used, for example, for centrally supplied air. In the illustrated embodiment, there is, within the latter additional feed channel 18, at least one feed channel 19 for supplying a secondary fuel 10, two further feed channels 18 for purposes not further explained here, and a feed channel 20 for the oxygen lance 12. This feed channel 20 for the oxygen lance 12 has an inner diameter D which is larger than the outer diameter of the oxygen lance 12, optionally including any thermal insulation of the oxygen lance 12, in particular, at least 20% larger. In the embodiment of FIG. 2, the feed channel 19 for secondary fuel lies at an angle above the feed channel 20 for the oxygen lance 12.

Figure 3:
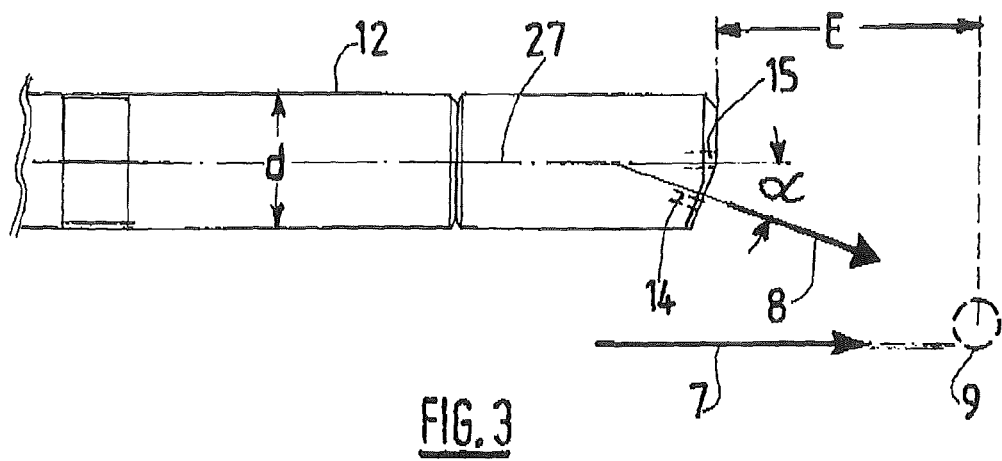

FIG. 3 shows a schematic longitudinal section with additional clarification of an end portion of the oxygen lance 12 with an angled nozzle 14 and a supplemental nozzle 15, which can be optionally provided. The oxygen lance 12 has an outer diameter d and a geometric centre axis 27. During operation, the angled nozzle 14 injects an oxygen-rich second stream 8 at an angle α to the geometric centre axis 27 of the oxygen lance 12. Said second stream 8 strikes the first stream 7 of secondary fuel in an intersection area 9. This intersection area 9 has a distance E of less than 5 m from the feed end of the oxygen lance 12, preferably less than 2 m. This is achieved in that the angle α of the angled nozzle 14 lies between 5° and 45°, preferably between 5° and 30°, more preferably between 5° and 25°, and most preferably between 10° and 20°.

FIG. 4 shows a schematic longitudinal section of the entire oxygen lance 12 and its connection lines with an oxygen tank 21. At its rear region, the oxygen lance 12 has an angle position indicator 13, on the basis of which the operator can recognize which direction the angled nozzle 14 of the installed lance 12 has in the interior of the rotary kiln 1. The oxygen lance 12 preferably has two inlet flanges 23 for the connection of tubular oxygen supply lines 22 which can supply liquid or gaseous oxygen-rich fluid 11 from the oxygen tank 21 with only a small pressure loss. It should be noted that the chemical purity of the oxygen-rich fluid is not essential for the process, whereby said oxygen-rich fluid can be oxygen or oxygen enriched gas or liquid, with an oxygen content of, for example, more than 50% vol, preferably more than 80% vol.

FIG. 5 further illustrates the spatial arrangement at the outlet of the burner assembly 3. It can be seen that the first stream 7 of secondary fuel from feed channel 19 is struck obliquely and laterally from below by the second stream 8 of oxygen-rich fluid in intersection area 9. The oblique outlet of the second stream 8 is achieved by the angled nozzle 14 on the oxygen lance 12, whereby the exact direction of the angled nozzle 14 can also be seen from outside the burner assembly 1 by means of the angle position indicator 13. Other feed channels 18 of the burner assembly 3 have little effect on this process.

The present invention may be considered for new constructions of burner assemblies for rotary kilns, but is particularly useful for retrofitting existing burner assemblies in which feed channels are available as required for inserting an oxygen lance in the present invention. Targeted delivery of gaseous or liquid oxygen, or oxygen-enriched gas or liquefied gas to a secondary fuel can significantly improve the combustion process and consequently significantly reduce exhaust emissions, in particular, the emission of carbon monoxide.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

REFERENCE TERM LIST

1 Rotary kiln
2 Cement
3 Burner assembly
4 Geometric centre axis of the burner assembly
5 Main burner
6 Primary flame (from combustion of primary fuel)
7 First stream (of secondary fuel)
8 Second stream (of oxygen-rich fluid)
9 Intersection area of the first and second streams
10 Secondary fuel
11 Oxygen-rich fluid
12 Oxygen lance
13 Angle position indicator
14 Angled nozzle
15 Auxiliary nozzle
16 First feed channel
17 Second feed channel
18 Further feed channel
19 Feed channel for secondary fuel
20 Feed channel for oxygen lance
21 Oxygen tank
22 Oxygen line
23 Inlet flange 24 Exhaust hood
25 Analyser
26 Insulation
27 Geometric centre axis of the oxygen lance
α Nozzle angle
D Diameter of the feed channel for the oxygen lance
d Diameter of the oxygen lance
E Distance between the intersection area and the burner assembly

What is claimed is:

1. A process for improved combustion of a secondary fuel supplied to a rotary kiln in a first stream, whereby the rotary kiln has a burner assembly including a main burner for primary fuel and a plurality of feed channels extending parallel to a main axis of the burner assembly for various media, one of said feed channels, called secondary fuel channel, being provided for supplying the first stream of the secondary fuel, characterized in that:
  a tubular oxygen lance for supplying an oxygen-rich stream is provided in or on another one of said feed channels, called oxygen channel, said lance having an angled nozzle arranged at its feed end, the oxygen lance being positioned so that the oxygen-rich stream emerging from the nozzle forms a second stream which impacts the first stream of secondary fuel at an angle thereto.

2. The process of claim 1, wherein the secondary fuel is supplied in the form of particles or shreds in a flow of compressed air.

3. The process of claim 1, wherein the oxygen-rich stream is an oxygen gas, an oxygen rich liquid, or a liquid oxygen.

4. The process of claim 1, wherein the level of one or more pollutants in an exhaust gas of the rotary kiln is measured and in that the oxygen lance is rotated and/or the supply of oxygen-rich gas or liquid is adjusted so that the level in the exhaust gas of the pollutant or of the sum of the pollutant or of the sum of the pollutants is minimized.

5. The process of claim 4, wherein the pollutant, or at least one of the pollutants, is carbon monoxide.

6. The process of claim 1, wherein the second stream strikes the first stream of secondary fuel within less than 5m after leaving the burner assembly.

7. The process of claim 1, wherein the second stream strikes the first stream of secondary fuel within less than 2m after leaving the burner assembly.

8. The process of claim 1, wherein the oxygen-rich gas or liquid is supplied in such an amount that a superstoichiometric total oxygen-to-fuel ratio is formed in the rotary kiln.

9. An apparatus comprising a rotary kiln and intended for improved combustion of a secondary fuel supplied in a first stream to the rotary kiln, whereby the rotary kiln has burner assembly with a main burner for supplying primary fuel and a plurality of feed channels for various media extending parallel to a main axis of the burner assembly, one of said feed channels being a secondary fuel channel for supplying the first stream of secondary fuel, characterised in that a tubular oxygen lance for supplying an oxygen-rich gas, or an oxygen-rich liquid, is positioned in or on another one of said feed channels, called oxygen channel, said lance having an angled nozzle at its feed end such that when, in operation, oxygen-rich gas or oxygen-rich liquid emerges from the angled nozzle and a second stream is formed of oxygen-rich gas or oxygen-rich liquid which impacts the first stream of secondary fuel at an angle thereto.

10. The process of claim 9, wherein the secondary fuel is supplied in the form of particles or shreds in a flow of compressed air.

11. The apparatus of claim 9, wherein the oxygen lance has an angle position indicator for indicating the direction of the angled nozzle inside the rotary kiln.

12. The apparatus of claim 11 wherein the angle position indicator protrudes from the burner assembly at its rear end, the tubular oxygen lance being positioned in the oxygen channel.

13. The apparatus of claim 9, wherein the angled nozzle forms an angle (α) of 5° to 45° with a geometric centre axis of the oxygen lance.

14. The apparatus of claim 9, wherein the oxygen lance has a non-angled auxiliary nozzle at its feed end.

15. The apparatus of claim 14 wherein the non-angled auxiliary nozzle is a Laval nozzle.

16. The apparatus of claim 9, wherein the tubular oxygen lance is positioned in the oxygen channel, whereby the inner diameter of the oxygen channel is at least 20% larger than the outer diameter d of the lance.

17. The apparatus of claim 9, wherein the oxygen lance has two inlet connections for connecting oxygen supply lines thereto.

18. The apparatus of claim 17, wherein the two inlet connections are inlet flanges and the oxygen supply lines are flexible tubes.

19. The apparatus of claim 9, wherein the oxygen channel and the secondary fuel channel are arranged in the burner assembly so that the geometric line connecting their feed ends does not intersect a geometrical centre axis of the burner assembly.

20. The apparatus of claim 9, wherein the secondary fuel channel and the oxygen lance are arranged so that the first stream enters the rotary kiln vertically higher than the second stream.

21. A process for retrofitting a rotary kiln having a burner assembly with a main burner for supplying primary fuel and a plurality of feed channels for various media extending parallel to a main axis of the burner assembly, one of said feed channels being a secondary fuel channel for supplying a first stream of secondary fuel, the process comprising:
  installing a tubular oxygen lance for supplying an oxygen-rich gas, or an oxygen-rich liquid, in or on another one of said feed channels, called oxygen channel, whereby said lance has an angled nozzle at its feed end, and
  adjusting the position of said tubular oxygen lance in said oxygen channel, so that when, in operation, oxygen-rich gas or liquid emerges from the angled nozzle a second stream is formed of oxygen-rich gas or liquid which impacts the first stream of secondary fuel at an angle thereto.

22. The process of claim 21, wherein the tubular oxygen lance is installed in the oxygen channel.

23. The process of claim 22, comprising measuring, in operation, the content of one or more undesired components in an exhaust gas of the rotary kiln and adjusting the position of the lance in the oxygen channel so that the content in the exhaust gas of the pollutant or of the sum of the pollutants is minimized.

24. The process of claim 23, wherein the pollutant, or at least one of the pollutants, is carbon monoxide.

* * * * *